(12) United States Patent
Garcia et al.

(10) Patent No.: US 8,788,815 B1
(45) Date of Patent: Jul. 22, 2014

(54) SYSTEM AND METHOD FOR CONTROLLING ACCESS TO DECRYPTED DATA

(75) Inventors: Eduardo Garcia, Austin, TX (US); Sergio A. Pena, Austin, TX (US)

(73) Assignee: Gazzang, Inc., Austin, TX (US)

( * ) Notice: Subject to any disclaimer, the term of this patent is extended or adjusted under 35 U.S.C. 154(b) by 327 days.

(21) Appl. No.: 13/362,961

(22) Filed: Jan. 31, 2012

Related U.S. Application Data

(60) Provisional application No. 61/438,196, filed on Jan. 31, 2011, provisional application No. 61/438,188, filed on Jan. 31, 2011, provisional application No. 61/438,192, filed on Jan. 31, 2011.

(51) Int. Cl.
*G06F 21/00* (2013.01)
*G06F 17/30* (2006.01)

(52) U.S. Cl.
USPC .......................................................... 713/165

(58) Field of Classification Search
CPC ................ G06F 21/6218; G06F 21/10; G06F 2221/2107; G06F 21/6209; H04L 63/0428
See application file for complete search history.

(56) References Cited

U.S. PATENT DOCUMENTS

| | | | | |
|---|---|---|---|---|
| 5,825,877 A * | 10/1998 | Dan et al. | | 705/54 |
| 6,678,828 B1 * | 1/2004 | Pham et al. | | 726/2 |
| 6,931,530 B2 * | 8/2005 | Pham et al. | | 713/165 |
| 7,143,288 B2 * | 11/2006 | Pham et al. | | 713/165 |
| 8,024,560 B1 | 9/2011 | Alten | | |
| 8,306,919 B2 * | 11/2012 | Sakamura et al. | | 705/64 |
| 8,667,267 B1 | 3/2014 | Garcia et al. | | |
| 2002/0073322 A1 * | 6/2002 | Park et al. | | 713/188 |
| 2005/0171983 A1 * | 8/2005 | Deo et al. | | 707/202 |
| 2005/0182749 A1 * | 8/2005 | Matsui | | 707/1 |
| 2006/0050877 A1 * | 3/2006 | Nakamura | | 380/46 |
| 2006/0143453 A1 * | 6/2006 | Imamoto et al. | | 713/169 |
| 2006/0156018 A1 * | 7/2006 | Lauer et al. | | 713/182 |
| 2007/0177737 A1 * | 8/2007 | Jung et al. | | 380/270 |
| 2007/0180255 A1 * | 8/2007 | Hanada et al. | | 713/176 |
| 2007/0186112 A1 * | 8/2007 | Perlin et al. | | 713/182 |
| 2007/0226488 A1 * | 9/2007 | Lin et al. | | 713/156 |
| 2007/0255943 A1 * | 11/2007 | Kern et al. | | 713/155 |
| 2009/0259838 A1 * | 10/2009 | Lin | | 713/150 |
| 2009/0307783 A1 * | 12/2009 | Maeda et al. | | 726/30 |
| 2010/0008509 A1 * | 1/2010 | Matsushita et al. | | 380/279 |

(Continued)

OTHER PUBLICATIONS

Notice of Allowance issued for U.S. Appl. No. 13/362,695, mailed Sep. 3, 2013, 15 pages.

Koe et al., "A Study on the Encryption Algorithm for RFID tag (SEED: 8 Rounds X 64 bit block," IEEE, 2008, pp. 672-677.

(Continued)

*Primary Examiner* — Jason K. Gee
*Assistant Examiner* — Sanchit Sarker
(74) *Attorney, Agent, or Firm* — Sprinkle IP Law Group (57) ABSTRACT

A method for accessing a protected file system includes receiving a request from a process to access the file system, the request including a requesting process identification and a requesting process name; decrypting an ACL to obtain ACL process names, ACL process identifications, and ACL process file checksums; allowing the process access to the file system if the requesting process name matches a corresponding ACL process name and the requesting process identification matches a corresponding ACL process identification; or allowing the process access to the file system if the requesting process identification does not match a corresponding ACL process identification but a calculated process file checksum matches a corresponding ACL process file checksum. In one embodiment, the ACL information can be stored in a key ring.

20 Claims, 8 Drawing Sheets

(56) References Cited

U.S. PATENT DOCUMENTS

| | | | |
|---|---|---|---|
| 2010/0198972 A1* | 8/2010 | Umbehocker | 709/226 |
| 2010/0296652 A1* | 11/2010 | Nakayama et al. | 380/201 |
| 2010/0325713 A1* | 12/2010 | Kurita et al. | 726/7 |
| 2011/0055578 A1* | 3/2011 | Resch | 713/176 |
| 2011/0078549 A1* | 3/2011 | Thueringer et al. | 714/807 |
| 2011/0276495 A1* | 11/2011 | Varadarajan et al. | 705/71 |
| 2011/0302417 A1* | 12/2011 | Whillock et al. | 713/168 |
| 2012/0036357 A1* | 2/2012 | Struik | 713/166 |
| 2012/0130874 A1* | 5/2012 | Mane et al. | 705/34 |
| 2012/0131341 A1* | 5/2012 | Mane et al. | 713/168 |
| 2013/0054976 A1* | 2/2013 | Brown et al. | 713/189 |

OTHER PUBLICATIONS

Kim et al., "Design and Implementation of a Private and Public Key Crypto Processor and Its Application to a Security System," IEEE, Feb. 2004, vol. 50 Issue: 1, pp. 214-224.

Duet al., "A Pairwise Key Predistribution Scheme for Wireless Sensor Networks," ACM, May 2005, vol. 8 Issue 2, pp. 228-258.

Cheng, "Security Attack Safe Mobile and Cloud-Based One-Time Password Tokens Using Rubbing Encryption Algorithm," ACM, Jun. 2011, pp. 304-336.

Office Action for U.S. Appl. No. 13/362,695, mailed Apr. 29, 2013, 23 pgs.

* cited by examiner

SYSTEM AND METHOD FOR CONTROLLING ACCESS TO DECRYPTED DATA

CROSS REFERENCE TO RELATED APPLICATIONS

This application is related to and claims priority from U.S. Provisional Application Ser. No. 61/438,196, filed Jan. 31, 2011, entitled "System and Method for Controlling Access to Encrypted Data," U.S. Provisional Application Ser. No. 61/438,188, filed Jan. 31, 2011, entitled "System and Method for Providing Authenticated Access to an Encrypted File System by a MySQL Process;" and U.S. Provisional Application Ser. No. 61/438,192, filed Jan. 31, 2011, entitled "System and Method for Communicating with a Key Management System;" all of which are incorporated by reference in their entireties as if fully set forth herein.

FIELD OF THE INVENTION

The present disclosure relates to encrypted file systems and, particularly, to systems and methods for controlling access to decrypted data.

BACKGROUND OF THE INVENTION

Encrypted file systems allow applications to store encrypted files in non-volatile storage, such as hard drives. Encrypted file systems are typically implemented as a stack of layers with an encryption layer on top of a mounted file system. eCrtypfs, for example, is a kernel-native stacked cryptographic file system included with many Linux distributions that layers on top of lower level file systems including Linux ext 2/3/4, NFS, CIFS, XFS, ReiserFS, JFS, FAT 32, and can be extended to other file systems. eCryptfs provides a virtual file system seen by applications so that file operations go through eCryptfs. eCryptfs uses keys stored in a kernel layer key ring to encrypt and decrypt files.

Many encrypted file systems were designed on the assumption that they would operate on a single machine and therefore files would be available to all processes on a machine (assuming the user logged in had the appropriate credentials). In a networked environment, such file systems do not provide adequate security for data because any process can access the encrypted files so long as the encrypted file system key ring contains the correct key. This problem becomes more pronounced in a cloud environment. In a cloud, processes running on the same hardware may be controlled by different entities that should not access each other's data. Furthermore, the cloud environment hardware may be administered by a different set of administrators than the virtual environment provided in the cloud. Consequently, it may be undesirable for some process or administrators who have physical access to the servers and credentials to access the operating system to access the encrypted data on the servers.

In addition to the inability to properly protect data from network users and administrators, another problem faced in cloud computing and other networked computer environments is properly managing encryption keys between distributed computers. In particular, it is undesirable to store keys in non-volatile memory on a cloud server, so the keys must be stored at another location and accessed over a network. For public networks, the keys must be kept safe during transmission between the key storage and cloud server. The key management system must ensure it is not distributing keys improperly.

SUMMARY OF THE INVENTION

These and other drawbacks in the prior art are overcome in large part by systems and methods as disclosed. Embodiments for accessing a protected file system store an access control list in a key ring and provide restricted access to the key ring, as well as to updates to the ACL itself.

A method for accessing a protected file system includes receiving a request from a process to access the file system, the request including a requesting process identification and a requesting process name; decrypting an access control list (ACL) to obtain one or more ACL process names, one or more ACL process identifications, and one or more ACL process file checksums; storing an access table in a key ring, the access table including the one or more ACL process names, one or more ACL process identifications, and one or more ACL process file checksums; checking the requesting process name for a corresponding ACL process name in the access table; and (i) allowing the process access to the file system if the requesting process name matches a corresponding ACL process name and the requesting process identification matches a corresponding ACL process identification; or (ii) allowing the process access to the file system if the requesting process identification does not match a corresponding ACL process identification but a calculated process file checksum matches a corresponding ACL process file checksum; and storing the requesting ACL process identification that did not match in the access table.

In some embodiments, adding a process to the access control list includes retrieving a passphrase and salt; using the passphrase and salt to calculate an encryption key and decrypting the access control list using the encryption key; reading the access control list; calculating a file checksum responsive to the reading the access control list; adding a name of the process and the file checksum to the access control list; and encrypting the access control list using the encryption key. In some embodiments, loading the access control list into the key ring includes receiving a passphrase and salt; using the passphrase and salt to generate an encryption key for decrypting the access control list; and loading the decrypted access control list into memory corresponding to the key ring.

A system according to some embodiments includes a network; a server coupled to the network, the server including an encrypted file system; one or more encrypted access control lists; a key ring maintained by the server and configured to store one or more lists of processes allowed to access the encrypted file system, the one or more lists of processes obtained from decrypting the one or more encrypted access control lists responsive to a request to access the encrypted file system. The request may include a requesting process identification and a requesting process name. The one or more encrypted access control lists may include one or more access control list process names, one or more access control list process identifications, and one or more access control list process checksums.

The key ring may be configured to maintain an access table including the one or more access control list process names, one or more access control list process identifications, and one or more access control list process checksums.

The server configured to check the requesting process name for a corresponding access control list process name in the access table and (i) allow a requesting process to access the encrypted file system if the requesting process name matches a corresponding access control list process name and the requesting process identification matches a corresponding access control list process identification; or (ii) allow the requesting process to access the encrypted file system if the requesting process identification does not match a corresponding access control list process identification but a calculated process file checksum matches a corresponding access control list process file checksum; and storing the requesting process identification that did not match in the access table.

The server may further be configured to add a process to the at least one of the one or more encrypted access control lists by: retrieving a passphrase and salt; using the passphrase and salt to calculate an encryption key and decrypting the at least one of the one or more encrypted access control lists using the encryption key; reading the at least one of the one or more encrypted access control lists; calculating a file checksum responsive to the reading the at least one of the one or more encrypted access control lists; adding a name of the process and the file checksum to the at least one of the one or more encrypted access control lists; and encrypting the at least one of the one or more encrypted access control lists using the encryption key.

The server may further be configured to load the at least one of the one or more encrypted access control lists into the key ring by: receiving a passphrase and salt; and using the passphrase and salt to generate an encryption key for decrypting the at least one of the one or more encrypted access control lists; and loading the decrypted at least one of the one or more encrypted access control lists into memory corresponding to the key ring.

DETAILED DESCRIPTION OF EMBODIMENTS

Embodiments and various features and advantageous details thereof are explained more fully with reference to the exemplary, and therefore non-limiting, examples illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments of the disclosure, examples of which are illustrated in the accompanying drawings. Wherever possible, like numerals will be used throughout the drawings to refer to like and corresponding parts (elements) of the various drawings.

Figure 1:
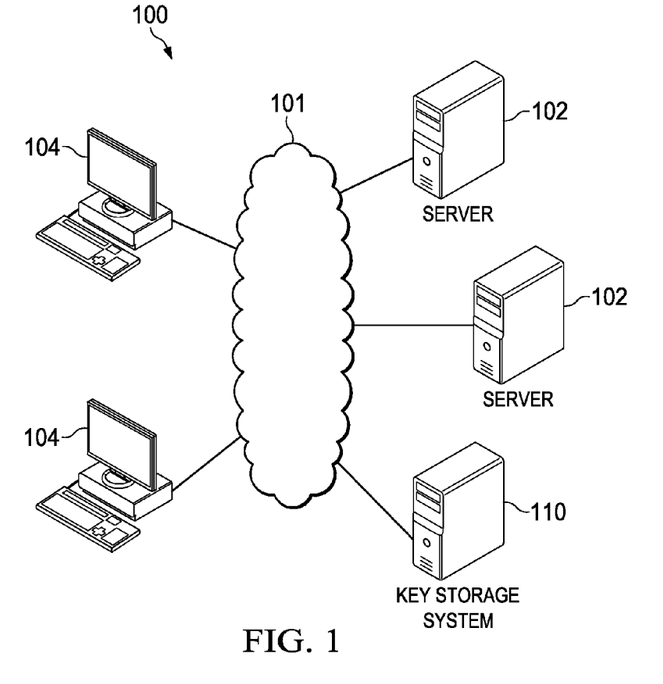
FIG. 1 is a block diagram of a network system in accordance with exemplary embodiments.

FIG. 1 is a diagrammatic representation of one embodiment of a digital information system 100 providing encryption of data for network applications, including cloud-based applications. System 100 can include multiple servers 102 providing network based applications and multiple client computers 104 accessing the networked based applications over a network 101, such as the Internet. Servers 102 can provide an encrypted file system such that data stored by servers 102 is protected. System 100 can further include a key storage system (KSS) 110 that stores information needed to decrypt data in an encrypted file system.

Figure 2:
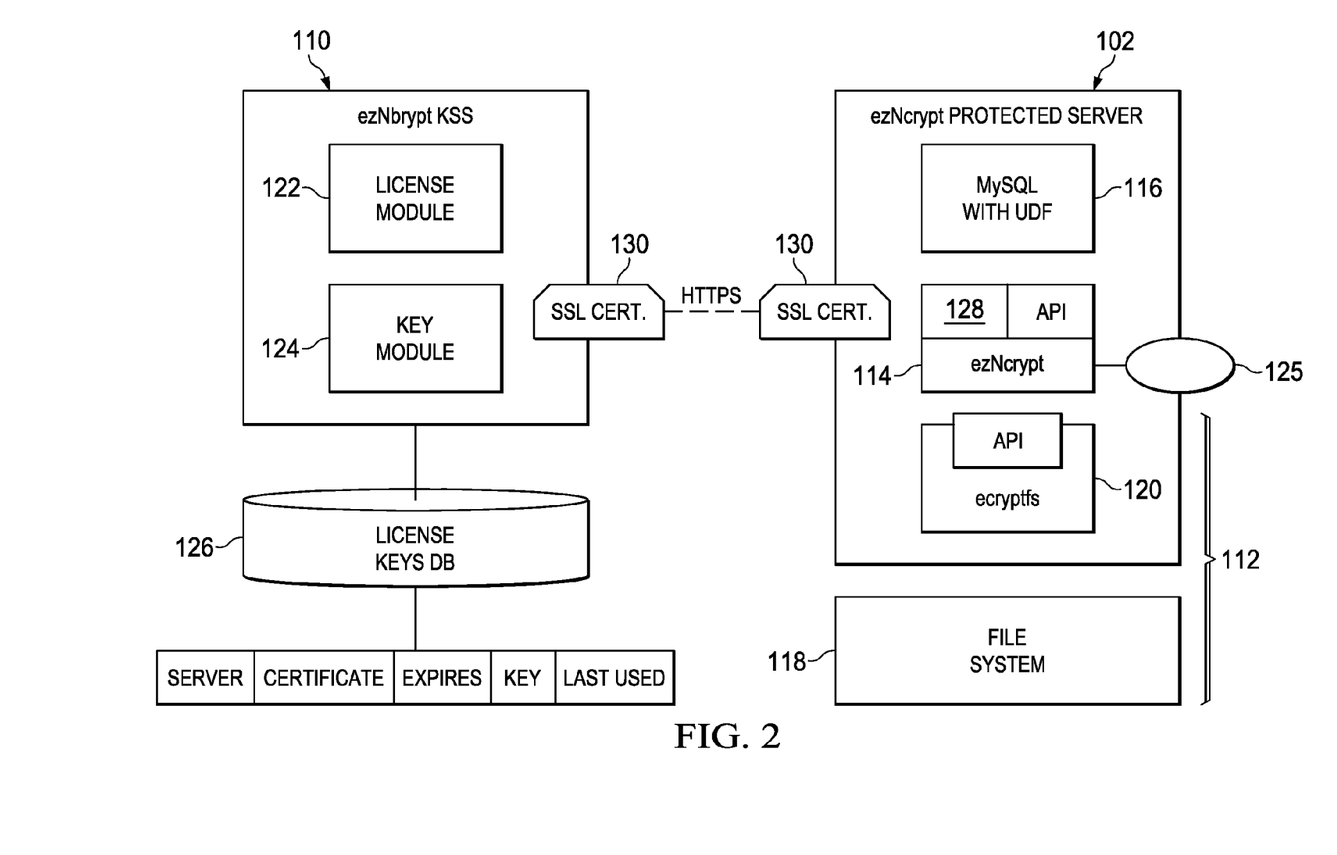
FIG. 2 is a diagram illustrating a key server and protected server in accordance with exemplary embodiments.

FIG. 2 is a block diagram representing one embodiment of software components of a server 102 and KSS 110. Server 102 can provide an encrypted file system 112, an encrypted file system interface module 114 (labeled ezNcrypt) and one or more applications 116. In the example illustrated, the application 116 can be a MySQL database server that provides a database for other applications (e.g., web applications running on server 102 or elsewhere, SAP applications or any other applications that can be provided on one or more servers or other computing devices). In the embodiment shown, encrypted file system 112 can be stacked file system. In this example, encrypted file system 112 has an underlying file system 118 (e.g., Linux ext 2/3/4, NFS, CIFS, XFS, ReiserFS, JFS, FAT3 or other file system) and the eCryptfs file system 120. It should be noted, however, that the foregoing is simply one example of an encrypted file system, and other suitable file systems may be used.

Key storage system (KSS) 110 includes a license module 122 and key management module 124. Key storage system 110 stores decryption keys or information necessary to generate the keys in a database 126.

Encrypted file system interface module 114 can be implemented as a thin-client between applications and encrypted file system 112. Encrypted file system module 114 can present a virtual file system (VFS) 128 to applications 116. This can be the virtual file system provided by the encrypted file system 112 (e.g., the eCryptfs VFS) or a virtual file system maintained by file system interface module 114 that maps to the encrypted file system. Encrypted file system interface module 114 can receive operations from applications 116 to read/write data. Encrypted file system interface module 114 interacts with the API of encrypted file system 112 to cause the data to be encrypted/decrypted. This can be done transparently to applications 116. That is, encrypted file system interface module 114 can provide transparent data encryption (TDE) such that the applications 116 are unaware of the encryption/decryption.

According to one embodiment, encrypted file system interface module 114 can maintain a key ring 125 of encryption keys or information needed to generate encryption keys. The key ring may also contain information regarding which processes can use keys in key ring 125 (either as a whole or on an individual key basis). The key ring 125 can be initialized at kernel level when the encrypted file system interface module 114 is loaded. In order to read encrypted data from encrypted file system 112, encrypted file system interface module 114 must have either the proper decryption key or information to generate the decryption key.

In some cases, the information for key ring 125 or used to generate keys for key ring 125 may be stored at KSS 110 and retrieved by encrypted file system interface module 114. As will be described in greater detail below, for information stored at KSS 110, KSS 110 and the encrypted file system interface module 114 can undergo a secure authentication process to ensure that encrypted file system interface module 114 is authorized to retrieve the information from KSS 110 and that the information is secure during transmission.

If server 102 and key KSS 110 are connected via the Internet or other relatively unsecure network, server 102 and KSS 110 can use an encrypted protocol for transmissions. By way of example, but not limitation, encrypted file system interface module 114 can communicate with key management module 124 using https. Server 102 and KSS 110 can utilize SSL certificates (e.g., indicated at 130) to help ensure secure communication. The SSL certificates can be managed by license module 122. In addition, server 102 and key storage system 110 can implement an authentication and response protocol to ensure keys or the information necessary to generate keys are only sent to authorized servers.

As will be discussed in greater detail below, in some embodiments, the authentication process is based upon encrypted request messages sent to the KSS 110. Such requests include the information shown in FIG. 3A. In particular, a request 300 according to one embodiment can include a seed block 302, a message block 304, and an encryption encapsulation block 306.

Figure 3A:
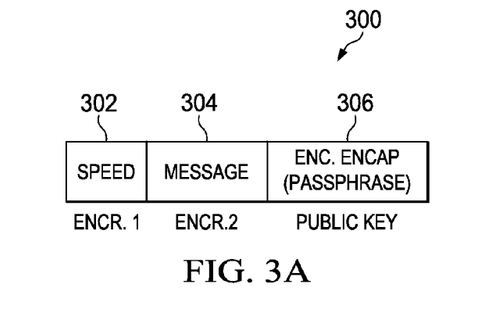
FIG. 3A, FIG. 3B, and FIG. 3C are diagrams illustrating exemplary encryption related messages in accordance with exemplary embodiments.

The seed block 302 may contain one or more seeds and can be used to prevent spoofing of messages based on, for example, packet sniffing. Seeds are alternatingly transported back and forth between the KSS 110 and the encrypted file system module 114. According to one embodiment, the initial seed can be generated and distributed as discussed below, or the encrypted file system module 114 can be configured to generate a seed. In any event, encrypted file system module 114 can include a seed in communication with the KSS 110.

As will be discussed in greater detail below, the seeds can be encrypted using a single use passphrase or random key. The single use passphrase can be generated based on any number of factors including a customer name, connection information, or other factors. Any mechanism for generating single use passphrases known or developed in the art can be used. Both KSS 110 and encrypted file system interface module 114 can be configured to generate single use passphrases/keys based on the specified factors.

The message block 306 is created by the encrypted file system interface module 114 and typically includes the substance of the request and a message hash. Encrypted file system interface 114 can encrypt the message block with a passphrase or key (e.g., a symmetric passphrase or other passphrase, which can be the same as or different than the single use passphrase/key used to encrypt the seeds in seed block 302).

The encryption encapsulation block 306 includes the information needed to decrypt the seeds block 302 and/or the message block 304. In particular, the encrypted file system interface module 114 encrypts the information needed to decrypt the seed block 302 and message block 304 in encryption encapsulation block 306. As one example, encryption encapsulation block 306 can contain a 128 bit string that contains a single use symmetric passphrase to decrypt the seed and/or message block. In one embodiment, encrypted file system interface module 114 encrypts this string in the encryption encapsulation block 306 using a public key.

Figure 3B:
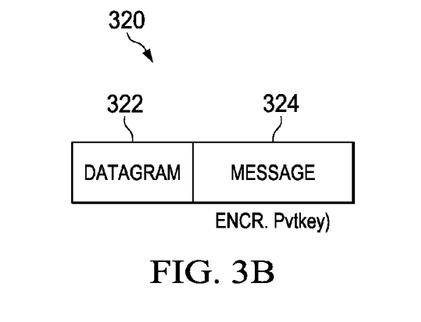

When the request is validated, KSS 110 generates a response 320 (FIG. 3B). This response 320 can include, for example, information necessary for encrypted file system module 114 to retrieve data from encrypted file system 112. In particular, the response 320 may have two blocks. The first block 322, in one embodiment, is an 8 bit datagram that describes the response as an error or as an encrypted response. The second block 324 contains a message with information responsive to the request. As will be described in greater detail below, the message body 322 can be encrypted with the passphrase provided in the encryption encapsulation block of the request and the private key of KSS 110 corresponding to the public key available to encrypted file system interface module 114.

Figure 3C:
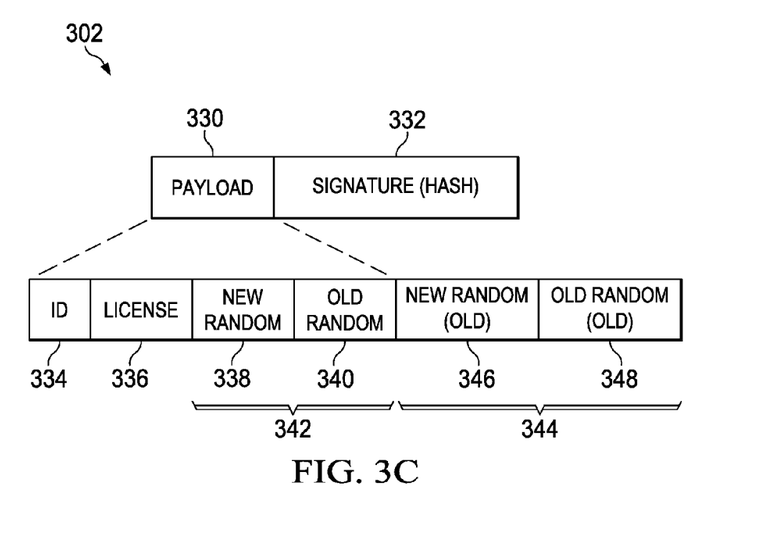

As noted above, seeds are alternatingly transferred between the KSS 110 and the encrypted file system module 114. As shown in FIG. 3C, a seed block 302 may include a payload 330 and a signature (hash) 332. The hash is used to ensure that the seed was not modified by a third party. According to one embodiment, the hash can be a SHA1 or MD5 hash string of payload 330 or a portion of payload 330.

The payload 330 may include an ID 334, a license 336, and one or more seeds. In the example illustrated, the seed block contains a new seed 342 and an old seed 344. The new seed 342 may include new and old random numbers 338, 340, while the old seed 344 includes new and old random numbers 346, 348. The ID 334 is a user machine identification sent during license activation. The license 336 is the encryption interface license number sent during license activation. The new and old random numbers 338, 340, 344, 346, according to one embodiment, are 42 character random numbers generated by the KSS 110, as will be explained in greater detail below.

Figure 4:
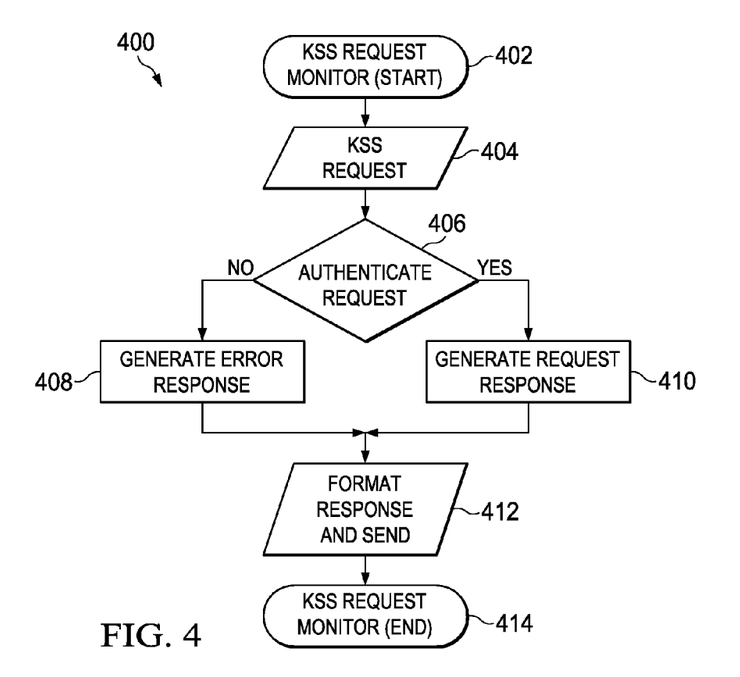
FIG. 4 is a flowchart illustrating operation of an exemplary embodiment.

FIG. 4 is a flow chart illustrating an overview of one embodiment of an authentication and response protocol. In a step 402, a KSS request 300 can be received at the KSS 110. If the KSS 110 is able to authenticate the request (as will be described in greater detail below)(step 404), then it can generate a request response 320 (step 408). If it cannot authenticate the request (step 404), then it will generate an error response (step 406). In either case, the response 320 is formatted and sent (step 410).

Figure 5:
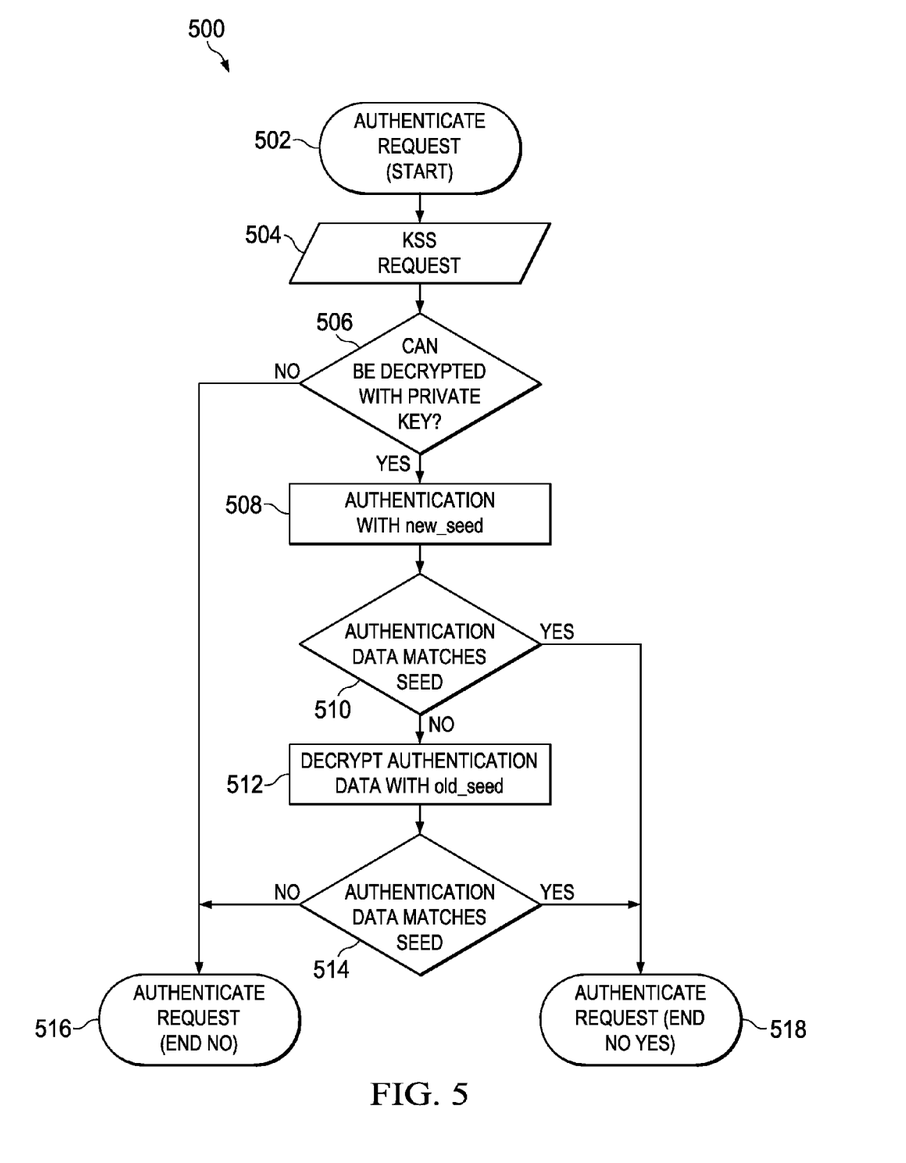
FIG. 5 is a flowchart illustrating operation of an exemplary embodiment.

FIG. 5 is a flowchart 500 illustrating one embodiment of a method for authenticating a request from a server. When KSS 110 receives a request in a process step 502, KSS 110 attempts to decrypt encryption encapsulation block 306 with the corresponding private key, in a process step 504. If this decryption is unsuccessful, KSS 110 generates an error in process step 506.

If decryption is successful (step 508), KSS 110 decrypts the message block 504 using the passphrase obtained in the encryption encapsulation block 506 to retrieve the message and message hash. KSS 110 also decrypts a seed block 302 and validates the seed against an expected "new" seed (e.g., a new seed)(step 508). Additionally, KSS 110 can generate a message hash and compare the generated hash against the hash received in the message block 304. If the seed and hashes match (step 510), the message is authenticated (step 516). If the new seed does not match, KSS 110 can decrypt an old seed (step 512). If the old seed matches the expected old seed and the hashes match (step 514), the message can be authenticated (step 516). In the response, KSS 110 can send a new seed to the encrypted file system module 114. The new seed sent by the KSS 110 will now become the new seed expected by KSS 110. If the hashes do not match or neither the old nor new seed in the request match the seed expected by KSS 110, KSS 110 can generate an error (step 506).

Using the foregoing authentication procedure, the KSS 110 will reject a request if the message 304 cannot be decrypted, the seed(s) 302 cannot be decrypted, the connection or customer data does not match, the hashes do not match, or seeds are not correct. Thus, the authentication protocol provides a high level of security for communications over untrusted networks.

Figure 6A:
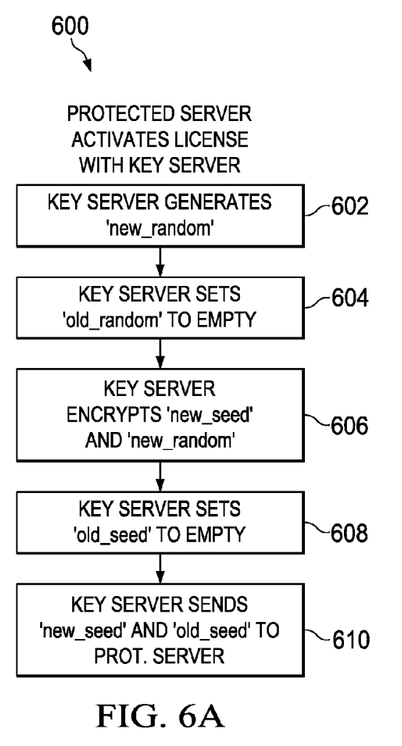
FIG. 6A and FIG. 6B are flowcharts illustrating operation of seed generation and rotation in accordance with exemplary embodiments.
Figure 6B:
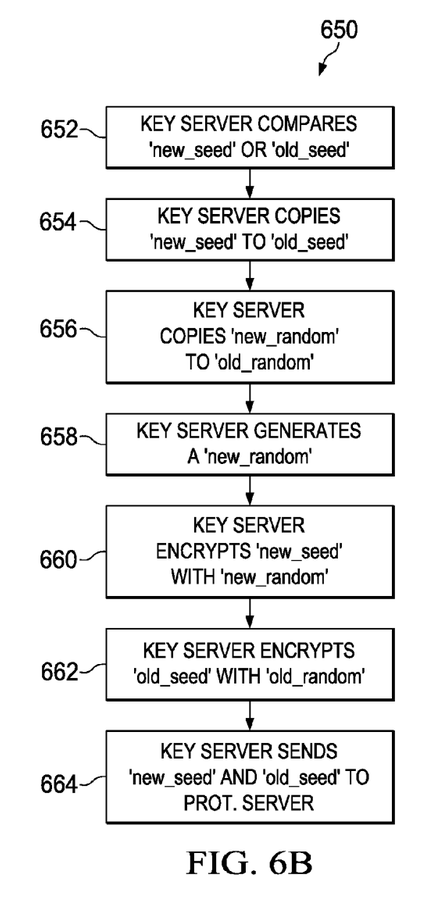

One embodiment of seed handling is discussed in greater detail with reference to FIG. 6A and FIG. 6B. In particular, FIG. 6A illustrates handling when a license is activated with the KSS 110, while FIG. 6B illustrates actions responsive to an encryption interface request. According to one embodiment, the first seed for a particular encryption interface module 114 can be generated when the encryption interface module first activates with KSS 110.

According to one embodiment, the first seed for a particular encryption interface module 114 can be generated when the encryption interface module first activates with KSS 110. Turning now to FIG. 6A, upon activation of a license with the KSS 110 the KSS 110 can create the initial new seed. Accordingly, KSS can generate a new random number, (new random number 338) (FIG. 3C) (step 602) and sets the old random number, 340 to "empty" (step 604). KSS 110 encrypts the seed block 302 as the "new seed" having the "new random" number, as new random number 338 and an empty old random number 340 (step 606). In a process step 608, the KSS 110 sets the old seed to "empty" (e.g., sets the "new random" number$_{i-1}$ 346 and old random number$_{i-1}$ 348 to empty). Using the simplified example of a single digit random number, an example set of random numbers encrypted in the old and new seeds is set forth below for the case of i=1 (e.g., when the encrypted file system interface module is activated):

a. New seed$_i$:
  i. "new random" number$_i$=3
  ii. "old random" number$_i$=0 b. Old seed$_i$:
  i. "new random" number$_{i-1}$=0
  ii. "old random" number$_{i-1}$=0

Finally, in a process step 610, the KSS 110 sends the new seed and the old seed to the encryption interface 114.

A subsequent request from the encrypted file system interface module 114 should include at least one of the new seed or old seed. When a valid request is received, KSS can update the seeds. FIG. 6B illustrates seed alternation operation when the KSS 110 receives a request from the encryption interface 114. At a process step 652, the KSS 110 will decrypt the seed block and compare the new seed or old seed received in the request with the expected new seed or old seed (as discussed above). For example, the KSS can decrypt a seed block 302 and compare the license, ID and new random numbern and old random number$_n$ to an expected combination of license, ID and "new random" numbers.

In response to the request the KSS may rotate the seeds. According to one embodiment KSS 110 can set the old seed to be equal to the previous new seed (e.g., set "old random" number (step 654)). In one example, "old random" number$_i$ 340 is set to the previous "new random" number$_{i-1}$ 338 (step 656). The KSS may then generate a "new random" number$_i$ 338 (step 658). The KSS 110 may then encrypt the "new random" number$_i$ and "old random" number$_i$ as part of the "new" seed (step 660). In process step 662, the KSS sets the old seed$_i$ to the values of the new seed$_{i-1}$. Finally, in a process step 664, the KSS will send the new seed and the old seed to the encrypted file system interface module 114.

Returning to the previous example using a single digit random number, an example new seed, and old seed, are illustrated:

a. New seed$_i$:
  i. "new random" number$_i$=2
  ii. "old random" number$_i$=3
b. Old seed:
  i. "new random" number$_{i-1}$=3
  ii. "old random" number$_{i-1}$=0

The process of rotating seeds can continue each time KSS 110 receives a request from the particular encrypted file system interface module. To continue with the previous example, an example new seed and old seed are illustrated for a third iteration:

a. New seed$_i$:
  i. "new random" number$_i$=9
  ii. "old random" number$_i$=2
b. Old seed$_i$:
  i. "new random" number$_{i-1}$=2
  ii. "old random" number$_{i-1}$=3

It should be noted that the use of the old seed accounts for the case in which the KSS receives a request, but communication is lost before the KSS can send a new seed back to the encrypted file system interface module. In such a case, the encrypted file system interface module 114 may still authenticate with the last seed it received. In other embodiments, the old seed may not be used or considered. In still other embodiments, the KSS may allow an encrypted file system module 114 to authenticate using any number of generations of old seeds.

Seeds can be rotated at each communication, request or other event. This minimizes the likelihood that an unauthorized user who discovered a seed in one communication (e.g., by packet sniffing and breaking decryption) will be able to authenticate with KSS 110 as the proper seeds will have changed by the time the unauthorized user discovers the seeds. It can be further noted that the KSS110 may generate different seeds for each activated encrypted file system interface module 114. Thus, even if the proper seed values are somehow discovered for one encrypted file system interface module 114, other file system interface modules 114 will not be compromised.

Figure 7:
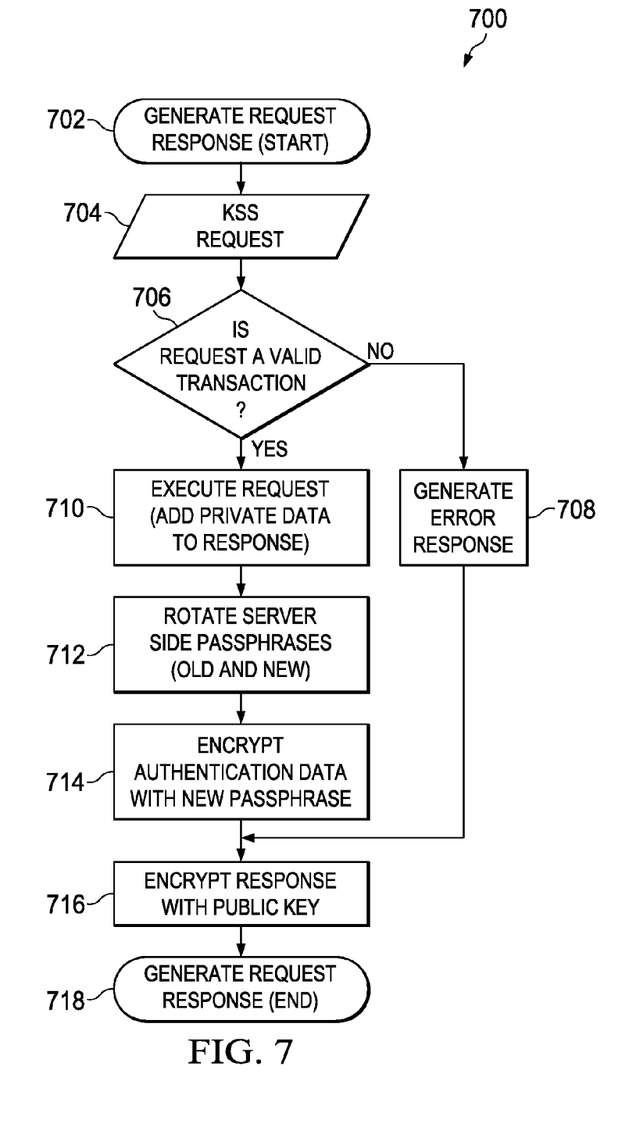
FIG. 7 is a flowchart illustrating operation of an exemplary embodiment.

FIG. 7 is a flow diagram illustrating one embodiment for generating a response 320. Once KSS 110 authenticates the request (step 702), KSS 110 validates the message portion of the request against a catalog of transactions that can be performed by encrypted file system interface module 114 (step 704). The transactions available may depend on the location of encrypted file system interface module 114, the entity running encrypted file system interface module 114 or other factors. Exemplary transactions can include requests to validate a license, change a key, check a license, etc. Thus, different transactions may be available to different installations of encrypted file system interface module 114.

Once the request is determined to be a valid transaction (step 708), the request is executed. That is, data is added to the message block 324 for transmission. This can include, for example, a new passphrase and salt, or other messages responsive to the request from the KSS 110. The KSS 110 may then rotate the seeds or passphrases, between the old and new ones (step 710). That is, the seed it received from the server is now the old seed and KSS 110 generates a new seed. In a step 712, the seed(s) are encrypted using the random key or passphrase. Finally (step 714), the response and/or passphrase random key is encrypted using the public key.

Thus, according to one embodiment, authentication data is sent on every communication. This data is signed with a secondary set of keys and encrypted with a single use symmetric passphrase generated at the service provider's end. This format allows checking the authenticity of the information source as well as integrity of the information. The solution warranties that the information sent form the server to the client are secret and untouched from a third party. This mechanism allows KSS 110 to trust that the machines that send and receive information and vice versa. Thus, KSS 110 can provide secure off-site key management.

It should be noted that each stage of encryption/decryption can be performed using the same or different encryption algorithms. Examples of such algorithms include, but are not limited to, RSA, AES, DEA, DES, Triple DES, Blowfish, Threefish, TEA or other encryption/decryption algorithms known or developed in the art.

Returning to FIG. 2, encrypted file system interface module 114 can be implemented to provide an encrypted file system for a variety of applications. According to one embodiment, encrypted file system interface module 114 can be implemented on a MySQL server (MySQL is an open source database available from Oracle Corporation, Redwood Shores, Calif.).

Figure 8:
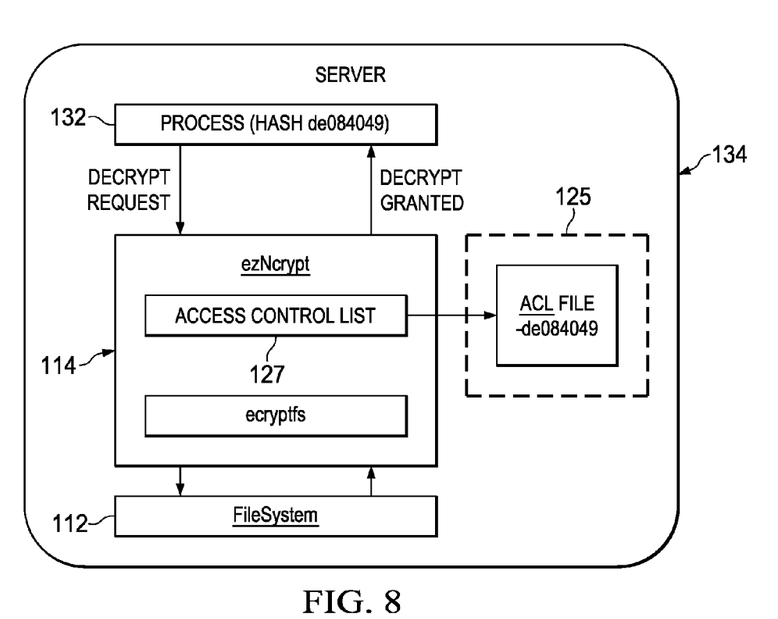
FIG. 8 is a flowchart illustrating operation of an exemplary embodiment.

FIG. 8 is a block diagram of one embodiment of components of a server 102 and interactions between the components. Server 102 can include encrypted file system 112, encrypted file system interface module 114 and an application process 132. When process 132 makes a request for data, encrypted file system interface module 114 requests the data from encrypted file system 112. Encrypted file system 112 verifies the encrypted file system interface module 114 has the correct key loaded in key ring 125 so that encrypted file system interface module 114 can mount encrypted file system 112.

Even if the correct key is loaded, however, it may be desirable to ensure that an authorized process is accessing the encrypted data. To this end, according to one embodiment, encrypted file system interface module 114 can maintain an ACL table 127 in memory that specifies which processes are authorized to use accessed. Information for the ACL table 127 can be stored in key ring 125.

Figure 9:
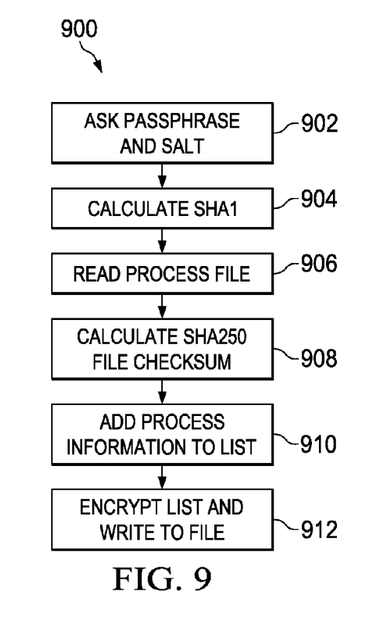
FIG. 9 is a flowchart illustrating operation of an exemplary embodiment.

FIG. 9 is a flow chart illustrating one embodiment of a process for creating or adding processes to ACL 127. In a process step 902, the encrypted file system interface module 114 retrieves a passphrase and a salt from KSS 110 or a user. This information is used to calculate an encryption key by encrypted file system 112. In one embodiment, in a process step 904, encrypted file system 112 (e.g., eCryptfs 120) will generate a cryptographic hash function or hash, for example using the Secure Hash Algorithm 1 (SHA1), used for accessing an ACL file.

In a process step 906, the encrypted file system interface module 114 reads a process file (e.g., stored by encrypted file system 112, provided by a user or otherwise provided) of permitted processes. In a process step 908, the encrypted file system interface module 114 calculates a file checksum, such as an MD5 file checksum or SHA256 file checksum for the process to be added to the process file (ACL file). According to one embodiment, the hash can be calculated over the entire process file for the process to be added. In a process step 910, the encrypted file interface module 114 adds the process name and checksum to a list of permitted processes in the ACL file and, in a process step 912, encrypts the updated list as encrypted ACL file. Thus, the ACL can include the process name (e.g., the full process path name) and hash value for each process and rules regarding the permissions for the processes (e.g., access to all or portion of the files, read/write permissions or other such rules that can be specified in file system ACLs). The new ACL can be loaded and used by the encrypted file system interface module 114 as described below.

Figure 10:
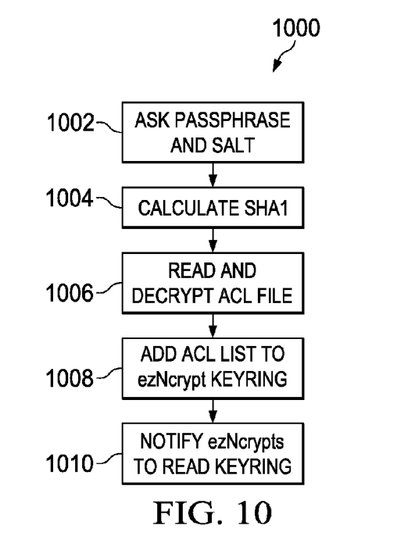
FIG. 10 is a flowchart illustrating operation of an exemplary embodiment.

FIG. 10 is a flow chart illustrating an embodiment of a method for loading an ACL into key ring 125. In a process step 1002, the encrypted file system interface module 114 receives the passphrase and salt (e.g., from KSS 110 or a user), passes the information to the encrypted file system 112 (e.g., to eCryptfs 120) so that the encrypted file system 112 generates the decryption key (step 1004), e.g., by generating an SHA1 hash. In a process step 1004, the encrypted file system 112 reads and decrypts the ACL file.

According to one embodiment, the encrypted file system interface module 114 uses the encrypted file system API to load the information from the ACL file into key ring 125 (step 1008). When the information from the ACL file is loaded, the encrypted file system 112 can notify the encrypted file system interface module 114 to read key ring 125 (step 1010). The encrypted file system interface module 114 uses the information in the key ring to create ACL table (or other data structure) 127 (e.g., in memory) that includes a process name, process ID, and process file checksum/hash. According to one embodiment ACL table 127 is accessible in user-space. The process name and checksum can be stored loaded from the ACL file. However, because process IDs may change on reboot, process IDs can be gathered from the processes as the processes make requests. If processes are to be added to the ACL table 127, the encrypted file system interface module adds process information to the ACL table (e.g., as described below in conjunction with FIG. 11).

Figure 11:
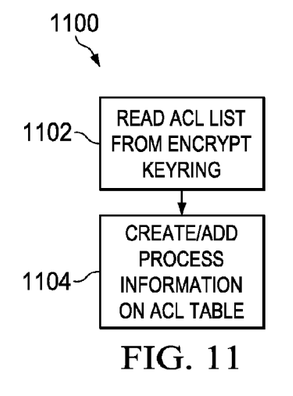
FIG. 11 is a flowchart illustrating operation of an exemplary embodiment.

FIG. 11 is a diagrammatic representation of one embodiment of a method for adding processes to the ACL table 127. In a process step 1102, the ACL information can be read from keyring 125 and process information can be added or created in ACL table 127, in step 1104. Once the ACL table 127 is loaded in memory, the encrypted file system interface module 114 is ready to accept connections from processes that are registered in the internal ACL table.

Figure 12:
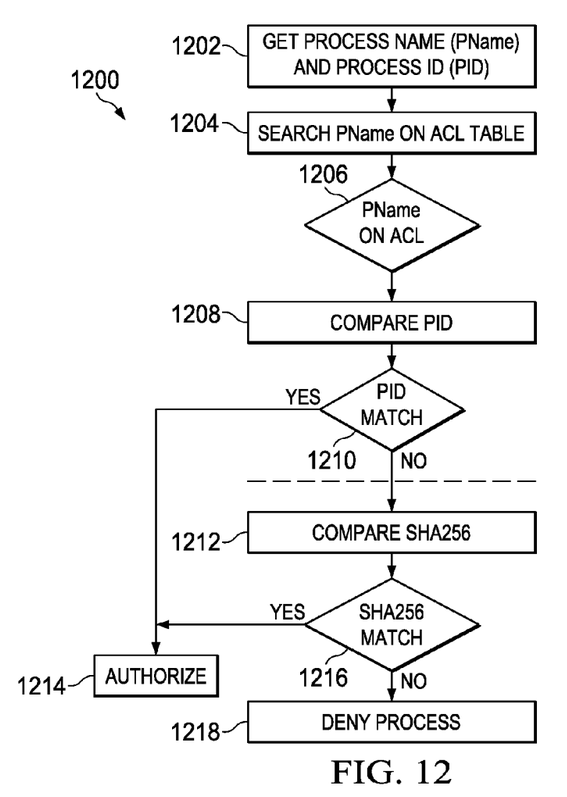
FIG. 12 is a flowchart illustrating operation of an exemplary embodiment.

FIG. 12 is a flow chart 1200 illustrating one embodiment of authorizing a process to read decrypted data. In a process step 1202, the encrypted file system interface module 114 receives the process name (PName) and process identification (PID) of a process that is attempting to access the encrypted file system. In response, in a process step 1204, the encrypted file system interface module 114 searches the PName on the ACL table 127.

If the process name does not match a process name in the ACL, as shown in process step 1206, the process is denied. If the process name does match, then in a process step 1208, the encrypted file system interface module 114 compares the PID of the requesting process to the list and in a process step 1210 and determines if the PID of the process requesting access matches the PID for the corresponding process name in ACL table 127.

If both the process name and process ID match a process in the ACL table 127, the encrypted file system interface module 114 will allow access (step 1214). If the PID does not match, the encrypted file system interface module 114 does a comparison of file checksums (such as SHA256 file checksums) on the process file (or process name) for the process requesting access to the file system versus the file checksum in the ACL for the corresponding PName (step 1212). If the checksums match for the PName, as determined at process step 1216, the PID for the process requesting access is added to the ACL table 127 and the process authorized (step 1214). If the checksums do not match, the process is denied access to decrypted data (step 1218). Assuming the process is authorized, on subsequent requests from the process, the appropriate process ID will be in the ACL table, obviating the need to calculate the file checksum again.

As can be appreciated, trying to calculate the file checksum of a process in every read/write access is inefficient because the calculation may be made thousands of times in one minute. Embodiments of FIG. 12 provide an advantage in efficiency because the file checksum calculation and comparison are made only once. If there is a match, the Process ID is saved into the ACL table, so the next time the process wants to access the file system, the encrypted file system interface module 114 will just compare both process ID (the process ID is assigned by the operating system and can change when a system is rebooted) and Process Name. After the next reboot, the process may receive a new process ID, so the MD5 or SHA256 checksum may have to be calculated and compared for the first request from the process after reboot.

In the above examples, the ACL 127 is used to determine whether processes can get access to decrypted data in general. In other embodiments, the ACL may specify which processes can use specific keys in key ring 125 or otherwise restrict access to decrypted data.

Figure 13:
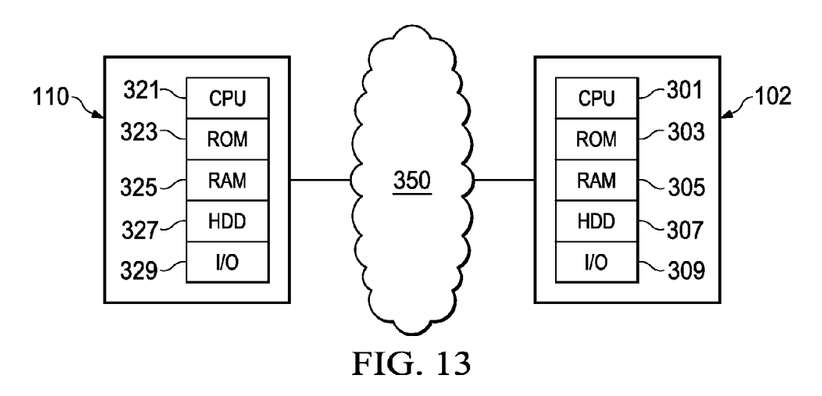
FIG. 13 is a diagram illustrating a system in accordance with exemplary embodiments

FIG. 13 depicts a simplified network architecture for an example computing environment where embodiments disclosed herein may be implemented. As one skilled in the art can appreciate, the exemplary architecture shown and described herein with respect to FIG. 13 is meant to be illustrative and not limiting. In FIG. 13, computing environment 1300 may comprise network 1350. In the simplified configuration shown in FIG. 13, network 1350 is bi-directionally coupled to a plurality of computers and/or machines. Server 102 and KSS 110 can comprise virtually any piece of hardware or electronic device capable of running software and communicating over a network. As an example, server 102 may include a central processing unit (CPU) 1301, read-only memory (ROM) 1303, random access memory (RAM) 1305, hard drive (HD) or non-volatile memory 1307, and input/output (I/O) device(s) 1309. An I/O device may be a keyboard, monitor, printer, electronic pointing device (e.g., mouse, trackball, etc.), network interface device or the like. The hardware configuration of computer 102 can be representative to other devices and computers alike coupled to network 1350. KSS 110 can similarly include a central processing unit (CPU) 1321, read-only memory (ROM) 1323, random access memory (RAM) 1325, hard drive (HD) or non-volatile memory 1327, and input/output (I/O) device(s) 1329. KSS 110 can maintain a database 126 used to store keys and certificate information.

Server 102 and/or KSS 110 can be a cloud implemented servers. In this context, a "cloud" is a scalable computer system or network that can be provisioned to create or mimic a desired hardware or software environment. Examples of clouds include, but are not limited to, Amazon Web Services' Elastic Compute Cloud ("EC2"), Vmware vCloud, Rackspace managed clouds, and other publicly available clouds.

Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers. The various modules describe above may be implemented as portions of the same program, different stand alone programs, portions of larger programs, plug-ins, or according to other suitable programming architecture.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure.

What is claimed is:

1. A method for accessing a protected file system, comprising:

receiving a passphrase and salt;
generating a decryption key using the passphrase and salt;
decrypting an access control list (ACL) using the decryption key to obtain one or more ACL process names and one or more ACL process file checksums;
storing an access table, the access table including the one or more ACL process names, one or more ACL process identifications, and the one or more ACL process file checksums;
receiving a request from a requesting process to access the file system, the request including a requesting process identification and a requesting process name;
checking the requesting process name for a corresponding ACL process name in the access table; and
(i) allowing the requesting process access to the file system if the requesting process name matches a corresponding ACL process name and the requesting process identification matches a corresponding ACL process identification; or (ii) allowing the requesting process access to the file system if the requesting process identification does not match a corresponding ACL process identification but a calculated process file checksum matches a corresponding ACL process file checksum and storing the requesting process identification that did not match in the access table.

2. The method in accordance with claim 1, further comprising adding a new process to the access control list wherein adding the new process to the access control list comprises:
   reading the access control list;
   calculating a file checksum for the new process to be added to the access control list;
   adding a name of the new process and the file checksum to the access control list; and
   encrypting the access control list using an encryption key.

3. The method in accordance with claim 1, further comprising loading access control list information from the decrypted access control list into a key ring, wherein the key ring is in a kernel layer.

4. The method of claim 3, further comprising creating the access table as accessible in user space, the access table containing access control list information from the key ring in the kernel layer.

5. A system, comprising:
   a network;
   a server coupled to the network, the server including an encrypted file system and an encrypted access control list, the server further comprising:
      a processor;
      a non-transitory computer readable medium storing a set of instructions executable by the processor to:
         receive a passphrase and a salt;
         generate a decryption key using the passphrase and salt;
         decrypt the encrypted access control list (ACL) using the decryption key to obtain one or more ACL process names and one or more ACL process file checksums;
         store an access table, the access table including the one or more ACL process names, one or more ACL process identifications, and the one or more ACL process file checksums;
         receive a request from a requesting process to access the file system, the request including a requesting process identification and a requesting process name;
         check the requesting process name for a corresponding ACL process name in the access table; and
         (i) allow the requesting process access to the file system if the requesting process name matches a corresponding ACL process name and the requesting process identification matches a corresponding ACL process identification; or
         (ii) allow the requesting process access to the file system if the requesting process identification does not match a corresponding ACL process identification but a calculated process file checksum matches a corresponding ACL process file checksum and store the requesting process identification that did not match in the access table.

6. The system in accordance with claim 5, wherein the server is configured to add a new process to the access control list by:
   reading the access control list;
   calculating a file checksum for the new process responsive to the reading the access control list;
   adding a name of the new process and the file checksum for the new process to the access control list; and
   encrypting the access control list using an encryption key.

7. The method in accordance with claim 1, wherein the access control list comprises permissions rules for processes.

8. The method in accordance with claim 1, wherein receiving the passphrase and salt comprises receiving the passphrase from a user.

9. The method in accordance with claim 1, wherein receiving the passphrase and salt comprises receiving the salt from a remote key server.

10. The method in accordance with claim 4, wherein creating the access table comprises reading access control information from the key ring in the kernel layer and wherein storing the access table comprises storing the access table in memory.

11. The system in accordance with claim 5, wherein the access control list comprises permissions rules for processes.

12. The system in accordance with claim 5, further comprising instructions executable to load access control list information from the decrypted access control list into a key ring in a kernel layer.

13. The system in accordance with claim 12, wherein creating the access table comprises reading access control information from the key ring in the kernel layer and wherein storing the access table comprises storing the access table in memory.

14. A computer program product comprising a non-transitory computer readable medium storing a set of computer instructions, the set of computer instructions executable by a processor to perform a method comprising:
   accessing an encrypted access control list (ACL);
   receiving a passphrase and a salt;
   generating a decryption key using the passphrase and salt;
      decrypting the access control list (ACL) using the decryption key to obtain one or more ACL process names and one or more ACL process file checksums;
      storing an access table, the access table including the one or more ACL process names, one or more ACL process identifications, and the one or more ACL process file checksums;
      receiving a request from a process to access the encrypted file system, the request including a requesting process identification and a requesting process name;
      checking the requesting process name for a corresponding ACL process name in the access table; and
      (i) allowing the requesting process access to the file system if the requesting process name matches a corresponding ACL process name and the requesting process identification matches a corresponding ACL process identification; or
      (ii) allowing the requesting process access to the file system if the requesting process identification does not match a corresponding ACL process identification but a calculated process file checksum matches a corresponding ACL process file checksum and storing the requesting process identification that did not match in the access table.

15. The computer program product in accordance with claim 14, wherein the method further comprises loading access control list information from the decrypted access control list into a key ring, wherein the key ring is in a kernel layer.

16. The computer program product in accordance with claim 15, wherein the method further comprises creating the access table as accessible in user space from information in the key ring.

17. The computer program product in accordance with claim 16, wherein creating the access table comprises reading access control information from the key ring in the kernel layer and wherein storing the access table comprises storing the access table in memory.

18. The computer program product in accordance with claim 14, wherein the method further comprises:
   reading the access control list;
      calculating a file checksum for a new process responsive to the reading the access control list;
      adding a name of the new process and the file checksum for the new process to the access control list; and
   encrypting the access control list using an encryption key.

19. The computer program product in accordance with claim 14, wherein the encrypted access control list comprises permissions rules for processes.

20. The computer program product in accordance with claim 14, wherein receiving the passphrase and salt comprises receiving the salt from a key server.

* * * * *